United States Patent [19]
Yoshida et al.

[11] Patent Number: 6,081,516
[45] Date of Patent: Jun. 27, 2000

[54] MULTIUSER RECEIVING DEVICE FOR USE IN A CDMA SYSTEM

[75] Inventors: Shousei Yoshida; Akihisa Ushirokawa, both of Tokyo, Japan

[73] Assignee: NEC Corporation, Tokyo, Japan

[21] Appl. No.: 08/906,892

[22] Filed: Aug. 6, 1997

[30] Foreign Application Priority Data

Aug. 6, 1996 [JP] Japan ..................................... 8-206935

[51] Int. Cl.$^7$ .................................................. H04B 7/216
[52] U.S. Cl. ........................................... 370/342; 370/479
[58] Field of Search ..................................... 370/320, 335, 370/342, 441, 479; 375/200–210, 346–349; 455/63

[56] References Cited

U.S. PATENT DOCUMENTS

| | | | |
|---|---|---|---|
| 4,470,138 | 9/1984 | Gutleber ................................... | 370/342 |
| 5,363,403 | 11/1994 | Schilling et al. ........................ | 370/441 |
| 5,467,368 | 11/1995 | Takeuchi et al. ........................ | 375/206 |
| 5,579,304 | 11/1996 | Sugimoto et al. ....................... | 370/342 |
| 5,646,964 | 7/1997 | Ushirokawa et al. ............... | 370/342 X |
| 5,719,852 | 2/1998 | Schilling et al. ........................ | 370/201 |
| 5,787,130 | 7/1998 | Kotzin et al. ............................ | 375/346 |
| 5,887,034 | 3/1999 | Suzuki .................................... | 375/285 |
| 5,894,500 | 4/1999 | Bruckert et al. ........................ | 375/346 |

OTHER PUBLICATIONS

Mahesh K. Varanasi et al, "Multistage Detection in Asynchronous Code–Division Multiple–Access Communications", *IEEE Transactions on Communications*, vol. 38, No. 4, Apr. 1990, pp. 509–519.

Atsushi Fukasawa et al, "Configuration and Its Performance of an Interference Cancellation System Using Pilot Signal for Radio Channel Estimation", *The Transactions of The Institute of Electronics, Information and Communication Engineers*, B–11 vol. J77–B–II No. 11 Nov. 1994, pp. 628–641.

Mamoru Sawahashi et al, "Serial Canceller Using Recursive Channel Estimation by Pilot Symbols for DS (Direct Sequence)—CDMA" *The Transactions of The Institute of Electronics, Information and Communication Engineers*, RF Communication Systems Technical Radio Report, RCS95–50, Jul. 1995, w/English Abstract.

Young C. Yoon et al, "A Spread–Spectrum Multi–Access System with a Cascade of Co–Channel Interference Cancellers for Multipath Fading Channels", *IEEE Second International Symposium on Spread Spectrum Techniques and Applications* (ISSSTA '92), Yokohama, Japan, Nov. 29–Dec. 2, 1992, pp. 87–90.

*Primary Examiner*—Huy D. Vu
*Assistant Examiner*—Jasper Kwoh
*Attorney, Agent, or Firm*—Sughrue, Mion, Zinn, Macpeak & Seas, PLLC

[57] ABSTRACT

In a multiuser receiver for use in a Code Division Multiple Access (CDMA) system to produce first through N-th demodulated signals for N-th users in response to an input signal where N is an integer not smaller than unity, the receiver has first through M-th stages, where M is an integer not smaller than unity. In each stage, first through N-th interference cancellation units are included to form the first through the N-th users. Each interference cancellation unit is supplied with a cancellation error signal obtained from a previous interference cancellation to produce an interference replica signal and a spread signal concerned with a difference between the interference replica signal and a previous interference replica signal. An n-th interference replica signal is successively sent to an n-th user of the following stages to be demodulated Into an n-th demodulated signal which is received by an n-th user where n is an integer between 1 and N, both inclusive.

13 Claims, 5 Drawing Sheets

MULTIUSER RECEIVING DEVICE FOR USE IN A CDMA SYSTEM

BACKGROUND OF THE INVENTION

This invention relates to a multiuser receiving circuit, namely, a multiuser receiver which is for use in a CDMA (Code Division Multiple Access) system. Herein, it is to be noted that the multiuser receiver can respond to a code multiple input signal to output a plurality of demodulated signals to a plurality of users, respectively, and includes a plurality of stages.

Recent attention has been directed to a CDMA system as a multiple-access system for mobile communication systems. This is because such a CDMA system which uses a spread spectrum technique might be able to increase an accomodation capacity of subscribers.

In the CDMA system, a user signal is spread with a wide frequency bandwidth by the use of a preassigned individual code and is transmitted in a common frequency as a CDMA signal through a transmission from a transmitter. The receiving circuit can detect a desired signal by means of despreading process from the CDMA signal and the preassigned individual code.

However, the CDMA system is disadvantageous in that interference occurs due to cross correlation among spreading codes assigned to users.

Multiuser receivers have been known which remove such interference by the use of all of spreading codes assigned to all users, transmission channel characteristics, and etc.

One of the multiuser receivers has been proposed by M. K. Varanasi and B. Aashang in the article entitled "Multistage Detection in Asynchronous Code Division Multiple-Access Communications" (IEEE Trans. Commun., Vol. COM-38, No. 4, pp. 509–519, April 1990).

The receiver proposed in the above article demodulates all user signals in an initial stage and forms an interference replica for each user. Thereafter, all interference replicas except for the desired signal are subtracted from an input signal received to remove the interference. In the following stage, demodulation is made again about the desired signal by using a signal obtained by the initial stage. As a result, the user signal quality is improved as compared with the initial stage. From this fact, it is readily understood that Interference cancellation characteristic is gradually improved by repeating this process several times with a multistage structure.

Another receiver has been also described by Fukazawa, T. Sato, Kawabe, S. Sato, and Sugimoto in a document entitled "Configuration and Its Performance of an Interference Cancellation System using Pilot Signal for Radio Channel Estimation" (THE TRANSACTIONS OF THE INSTITUTE OF ELECTRONICS, INFORMATION AND COMMUNICATION ENGINEERS, B-II Vol. J77-B-II No. 11 November 1994). The receiver mentioned in this document has a serial structure for cancelling interference and is simple in structure. In addition, such a structure can save a replica memory by handling a decision symbol as an interference replica for each user.

However, on the demodulation process of each stage in this receiver, an interference cancellation characteristic has been lowered when a transmission channel estimation error is large. This is because a transmission channel characteristic which is estimated from a signal before channel interference cancellation is used in each stage.

Under the circumstances, proposal has been recently made about a receiver which uses transmission channel characteristics estimated at the respective stages to improve an interference cancellation characteristic.

Such a receiver has been described by Sawahashi, Miki, Ando, and Higuchi in a document entitled "Serial Canceller Using Recursive Channel Estimation by Pilot Symbols for DS (Direct Sequence)—CDMA" (THE TRANSACTIONS OF THE INSTITUTE OF ELECTRONICS, INFORMATION AND COMMUNICATION ENGINEERS, RF Communication Systems Technical Radio Report, RCS95-50, July 1995). This receiver employs a serial structure that successively demodulates user signals in the order of reception levels from a highest one to a lowest one and that successively performs interference cancellation.

At any rate, a conventional multiuser receiver of the CDMA system has a plurality of stages each of which forms an interference cancellation processing circuit for each user. This structure is substantially equivalent to that mentioned in the above-referenced documents.

Specifically, the multiuser receiver previously ranks reception levels of all users from a highest one to a lowest one and successively carries out demodulation and interference cancellation process from the highest level. Such a ranking operation may be carried out by using a reception signal once or by successively using the interference cancellation signal at each stage.

In case of performing interference cancellation at each stage, the interference replica (desired signal) must be transferred between stages. The interference replica must be stored in a memory because a time difference is present between interference cancellation processes carried out for the same user at each stage. This interference replica is conventionally by a spread signal of each user and is represented by an oversampling value. This results in a necessity for a large-scale memory to store them.

The above interference replicas are represented by a composite signal of multipath signals. On performing a despreading process for the specific path signal, asynchronous path signal components of interference replica (desired signal) cause interference due to an autocorrelation. The influence of this interference cannot then be removed no matter how many stages are used in the receiving circuit.

A system has been proposed to solve this problem so that, on processing the specific path signal, interference signals for the other users are subtracted from input signal along with interference signals on other path signals of desired user. In other words, consideration has been made concerning the method in which the replica on only the specific path signal is added by an adder.

Such a technique has been described by Y. C. Yoon, R. Kohno, and H. Imai in a document entitled "A Spread-Spectrum Multi-Access System with a Cascade of Co-Channel Interference Cancellers for Multipath Fading Channels" (Proc. IEEE Second International Symposium on Spread Spectrum Techniques and Applications (ISSSTA) '92, pp. 87–90, December 1992).

In this document, all multipath signals other than the main path signal (the highest level path signal) are handled or regarded as interference. As a consequence, other multipath signals are not utilized to be combined into the desired signal. Stated otherwise, this is equivalent to using only the spread signal for the main path signal as the interference replica.

In contrast, if an interference replica is prepared for each path and addition and despread processes are made for each path, then during despread of the specific path signal, all multipath signals other than the specific path signal will not give any interference.

However this structure has the drawback that, since the spread signal for each path is utilized as the interference replica, a memory becomes very large.

SUMMARY OF THE INVENTION

In view of the above, it is therefore an object of this invention to provide a multiuser receiver which is for use in a CDMA system and which can reduce a transmission amount of interference replica between stages by utilizing symbol rate processing.

This can greatly reduce a memory of an interference replica.

It is another object of this invention to provide a multiuser receiver of the type described, which can improve an interference cancellation characteristic in multipath transmission channel by processing the interference replica for each path signal.

According to an aspect of this invention, a multiuser receiver is for use in a Code Division Multiple Access (CDMA) system to produce first through N-th demodulated signals for N-th user in response to an input signal where N is an integer not smaller than unity. The receiver has first through M-th stages, where M is an integer not smaller than unity. The multiuser receiver comprises first through N-th interference cancellation units, which are included at each stage within the first through the M-th stages and which are supplied with cancellation error signals obtained from a previous interference cancellation, for producing first through N-th interference replica signals of the present stage and first through N-th spread signals concerned with differences between the interference replica signals of the present stage and interference replica signals of a previous stage.

In this event, the first through the N-th interference cancellation units of the present stage are coupled in serial to one another to supply first through the (N−1)-th cancellation error signals to the second through N-th interference cancellation unit for N-th users and an N-th cancellation error signal to the first interference cancellation unit for the first user of a next stage.

The multiuser receiver comprises first through N-th delay units for delaying the first through the (N−1)-th cancellation error signals to produce first through (N−1)-th delayed cancellation error signals and first through N-th adders, coupled to the first through the N-th interference cancellation units and the first through the N-th delay units, for subtracting the first through the N-th spread signals from the first through the (N−1)-th delayed cancellation error signals to produce the first through the N-th cancellation error signals, respectively.

According to another aspect of this invention, the multiuser receiver comprises first through N-th interference cancellation units (ICU), which are included at each stage within the first through the M-th stages and which are supplied with an cancellation error signal obtained at a previous stage, for producing first through N-th interference replica signals of a present stage and first through N-th spread signals concerned with differences between the interference replica signals of the present stage and interference replica signals of a previous stage, a delay unit, which is included each stage, for delaying the cancellation error signal to produce a delayed cancellation error signal, and subtracting means for subtracting a total of the first through the N-th spread signals sent from the present stage from the delayed cancellation error signal to supply a result of subtraction as a new cancellation error signal to the next stage.

According to another aspect of this invention, the multiuser receiver comprises first through N-th interference cancellation units (ICU), which are included at each stage within the first through the M-th stages and which are supplied with an cancellation error signal obtained at a previous stage, for producing first through N-th interference replica signals of a present stage and first through N-th spread signals concerned with differences between the interference replica signals of the present stage, a delay unit, which is included at each stage, for delaying the input signal to produce a delayed input signal, and subtracting means for subtracting a total of the first through the N-th spread signals sent from the present stage from the delayed input signal sent from the delay unit at the present stage to supply a result of subtraction as a new cancellation error signal to the next stage.

DESCRIPTION OF THE PREFERRED EMBODIMENTS

Figure 1:
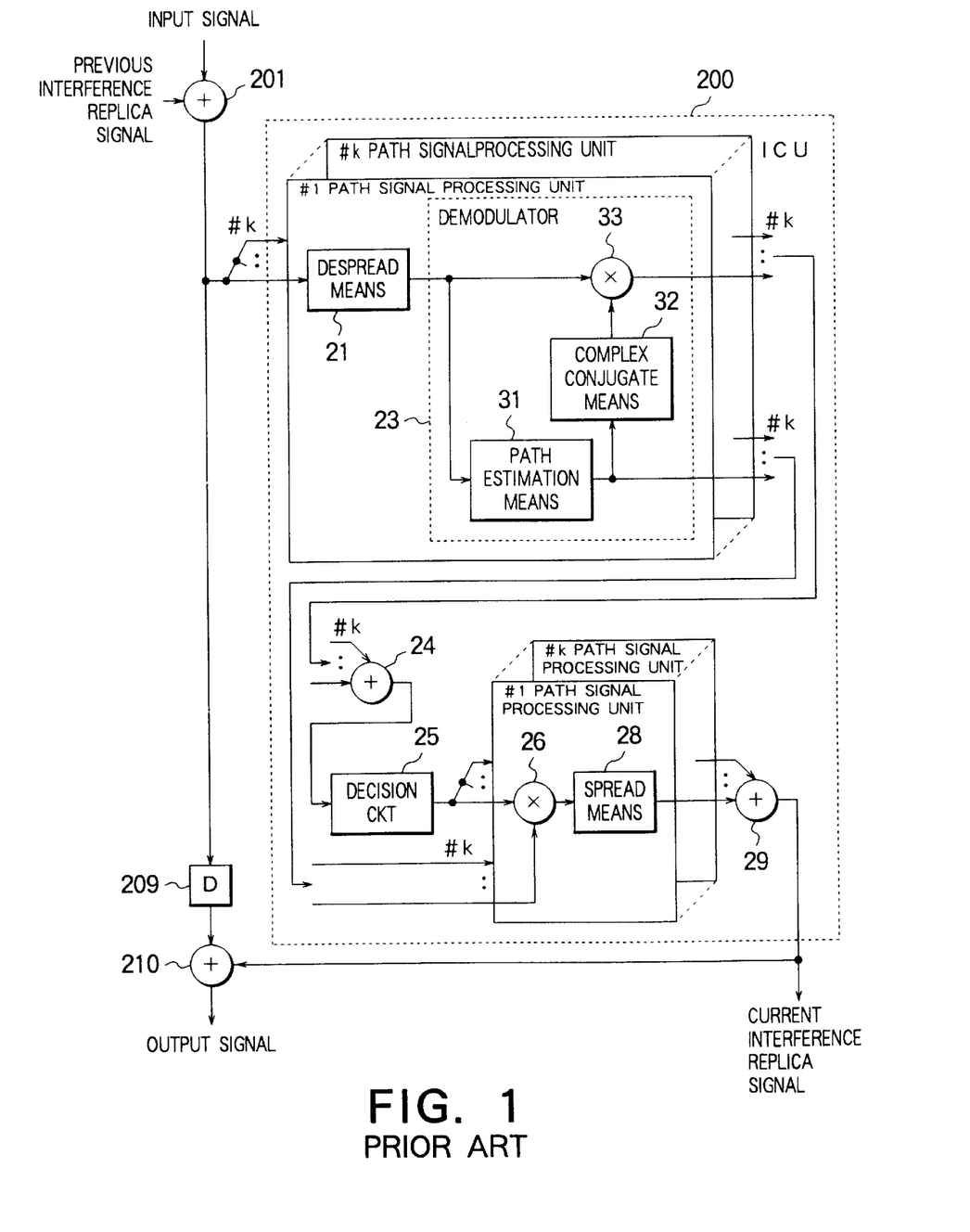
FIG. 1 is a block diagram of one example of an interference cancellation unit of a conventional multiuser receiver.

Referring to FIG. 1, description will be made about a conventional multiuser receiver which is for use in a CDMA system and which is substantially equivalent to a sequential structure mentioned in the document referenced in the preamble of the instant specification. The illustrated receiver is formed by a plurality of interference cancellation circuits each of which forms a processing stage simply called a stage.

In FIG. 1, it is assumed that the multiuser receiver is used for first through N-th users and which has first through M-th stages, where N and M are integers not smaller than unity, and that the illustrated multiuser receiver is specified by an m-th stage of the interference cancellation circuit structured for an n-th user, where m is an integer which is not smaller than unity and which is not greater than M and n is an integer which is not smaller than unity and which is not greater than N.

Herein, it is to be noted in the illustrated multiuser receiver that reception levels for all users are ranked beforehand to form reception level ranking and that each stage carries out demodulation and interference cancellation operation in the order from a highest level. Such ranking may be formed by the reception signal for once or may be successively or recursively formed at each stage with reference to interference cancellation signal.

When the illustrated stage is assumed to be the first stage, an adder 201 shown In FIG. 1 is not given any previous interference replica signal. In addition, the reception signal itself is given as an input signal r1,1 for the first user at the first stage.

When the illustrated stage is assumed to be not the first stage, an error signal $r_{m,n}$ is given as the input signal and is added to the interference replica signal (a desired signal) $r_{m-1,n}$ which is estimated at a previous one of the stages.

Herein, the error cancellation signal rm,n is obtained by the interference cancellation processing which is concerned with a previous one (n−1) of the users or which is concerned with the N-th or the last user at the previous stage when the user is the first user.

An interference cancellation unit (ICU) 200 has first through K-th path signal processing units (K≧1 integers) which correspond to first through K-th multipaths and which comprise despread means 21 and demodulators 23, respectively.

In a k-th signal processing units (1≦k≦K), the despread means 21 reversely spreads an output signal sent from the adder 201 by using a spreading code $c_{n,k}$ assigned to the n-th user in timed relationship with the k-th path. The illustrated demodulator 23 is structured by path estimation means 31, complex conjugate means 32, and a multiplier 33. In the demodulator 23, the path estimation means 31 is supplied with an output signal from the despread means 22 to estimate a transmission channel characteristic on the basis of the output signal of the despread means 21, to send an estimated transmission channel characteristic to the multiplier 33 through the complex conjugate means 32, and to carry out coherent detection, namely, phase synchronization.

At the same time, the multiplier 33 serves to weight an amplitude of the output signal sent from the despread means 21 by an output signal of the complex conjugate means 32 by a RAKE (maximum ratio) combining technique.

For this demodulator 23, a coherent demodulator is effective when it is used within a fading environment. Such a coherent demodulator is described in the document which is entitled "Serial Canceller Using Recursive Channel Estimation by Pilot Symbols for DS (Direct Sequence)—CDMA" and which has been previously referenced. The coherent demodulator mentioned in the document uses an interpolation technique of a pilot symbol.

The adder 24 combines first through K-th weighted demodulator output signals sent from the multipliers 33 together, by the use of the RAKE combining technique and sends the result to a decision circuit 25. The decision circuit 25 then identifies the most likely transmission symbol $d_{m,n}$ from an output signal of the adder 24.

The multiplier 26 and spread means 28 are connected in serial to each other in each of the first through the K-th paths. The multiplier 26 multiplies the output signal of the decision circuit 25 by the output signals of the path estimation means 31 at every path. Herein, each output signal of the path estimation means 31 is representative of the transmission channel characteristics. The spread means 28 then spreads the output signal of the multiplier 26 by the use of the n-th user spreading code $c_{n,k}$ in timed relationship with each path (the k-th path) of the multiplier 26.

An adder 29 obtains a current stage interference replica signal $x_{m,n}$ for the n-th user by adding first through K-th replica signals to one another.

In the meanwhile, a delay unit 209 delays sending the output signal of the adder 201 to the adder 210 until the adder 29 produces the output signal. Incidentally, the delay at the ICU 200 mainly occurs in the despread means 21.

The adder 210 is supplied from the delay unit 209 with a delay output signal which is equal to a sum of the cancellation error signal $r_{m,n}$ and the interference replica signal $x_{m-1,n}$. In this event, the adder 210 subtracts the delay output signal from the current stage interference replica signal $x_{m,n}$ and renews a cancellation error signal $r_{m,n+1}$. Specifically, the error signal $r_{m+1,n}$ is renewed when the final N-th user is handled at each stage. Such a cancellation error signal $r_{m,n+1}$ or $r_{m+1,n}$ renewed is given to an interference cancellation unit prepared for the next user to carry out interference cancellation.

In the above-mentioned example, the interference replica signal $x_{m,n}$ must be transferred between the stages. The interference replica signal $x_{m,n}$ must also be temporarily stored due to the difference among interference processing times for the same user at each stage. This interference replica signal $x_{m,n}$ is a spread signal assigned to each user and this interference replica signal $x_{m,n}$ uses an oversample value. Under the circumstances, a large-scale memory is needed to store such interference replica signal.

The above interference replica $x_{m,n}$ is a composite signal given by combining the path signals. When the despread, namely, despread means 21 is used for demodulation of the path signal of desired user, the interference replica signal $x_{m,n}$ other than for the path signal of desired user may become a source of interference due to an autocorrelation. This type of interference cannot then be removed no matter how many stages are used in the receiver.

Hereafter, description will be made about embodiments of this invention with reference to the drawings.

Figure 2:
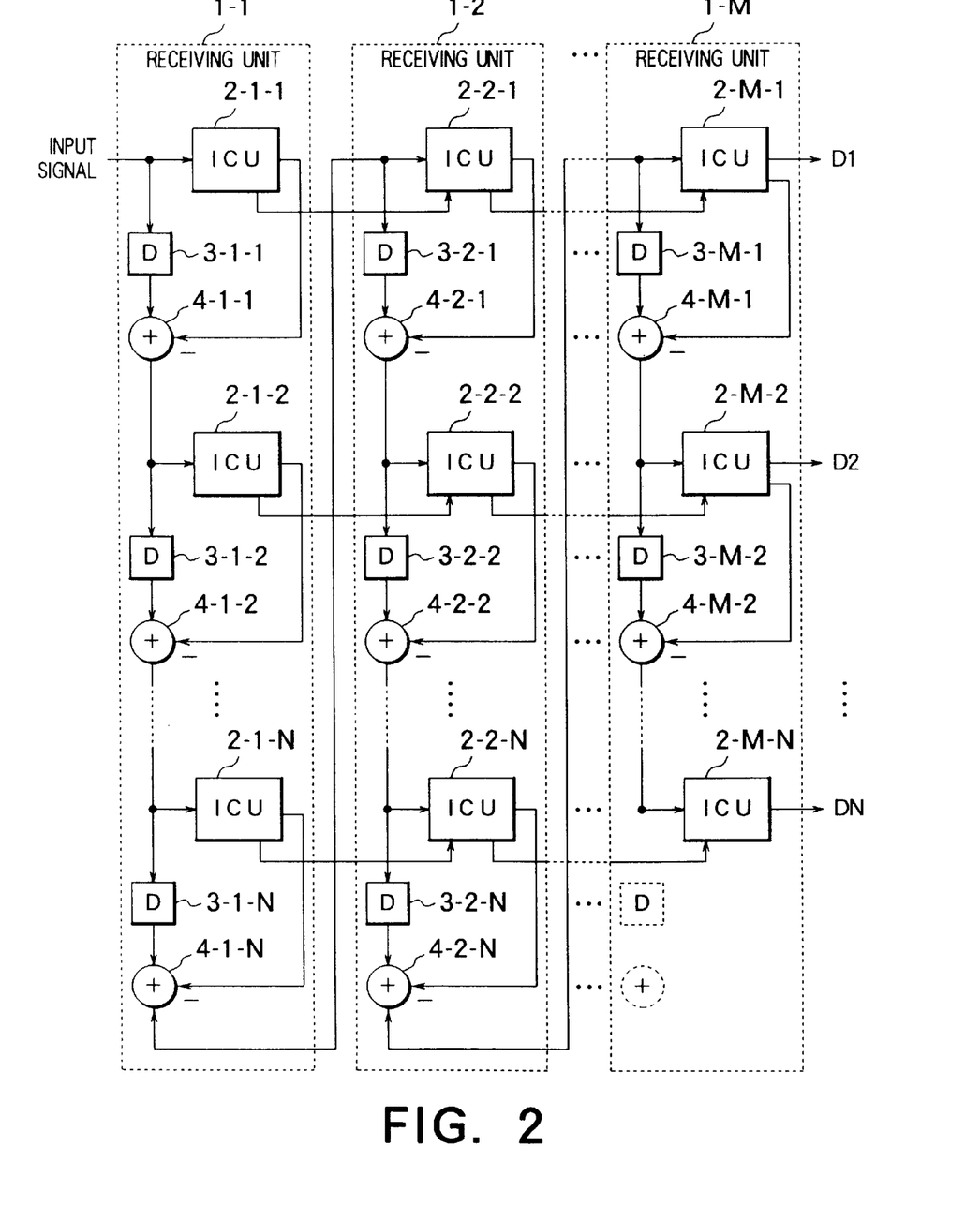
FIG. 2 is a block diagram of a multiuser receiver according to a first embodiment of the invention.

Referring to FIG. 2, a multiuser receiver according to a first embodiment of the invention is for use in a CDMA system and is formed by a plurality of receiving units 1-1, 1-2, and 1-M where M is an integer not smaller than unity. In other words, the illustrated receiver has first through M-th stages of the receiving units.

Each of the receiving units 1-1, 1-2, and 1-M has reception level ranking for all users formed beforehand and is divided into first through N-th users with reference to the reception levels where N is an integer not smaller than unity.

In the illustrated example, the first through the N-th users are connected in serial to one another in each stage of the receiving units. Demodulation and interference cancellation operations in each stage are successively carried out from a highest one of the reception levels to a lowest one. Herein, it is presumed that such operations are successively carried out from the first user to the N-th user in the example.

More specifically, the receiving unit 1-m (1≦m≦M) has first through N-th interference cancellation units (ICU) 2-m-1 to 2-m-N, first through-N-th delay units (D) 3-m-1 to 3-m-N, and first through N-th adders 4-m-1 to 4-m-N. For brevity of description, description will be restricted to an n-th (1≦n≦N) user. In this connection, the interference cancellation unit, the delay unit, and the adder will be represented by ICU 2-m-n, 3-m-n, and 4-m-n.

As shown in FIG. 2, the ICU 2-m-n is given an input signal which is different from each other when it is located for the first user and the remaining users. In the first user, namely, the highest user, the ICU 2-m-n is supplied with the cancellation error signal which results from the interference cancellation processing of the N-th or the lowest user of a previous one (m−1) of the stages preceding the m-th stage.

In the remaining users, the ICU 2-m-n is supplied with the error cancellation signals which result from the interference cancellation processing of a higher user (n−1). In addition, the ICU 2-m-n except for the first stage of the receiving unit 1-1 is given the interference replica signal which is estimated by the ICU of the same user at the previous stage (m−1). At any rate, the interference replica signal is re-estimated at the current m-th stage of the receiving units 1-m and is sent to the ICU 2-(m+1)-n of the same user n located for the next stage (m+1) of the receiving unit 1-(m+1). Simultaneously, a result of spreading process is produced which is concerned with a difference between the current or m-th interference replica signal and the previous or (m−1)-th interference replica signal.

At the last stage or the M-th stage 1-M of the receiving units, the ICU 2-M-1, 2-M-2 and 2-M-N need not re-estimate the current or M-th interference replica signals and may produce results of demodulation as first through N-th demodulated signals which may be delivered to the first through the N-th users, respectively.

As mentioned above, the ICU 2-1-1 for the first user of the first stage is given the input or reception signal itself as the cancellation error signal. In the illustrated example, the M-th stage of the receiving unit 1-M has neither a delay unit (D) 3-M-N nor an adder 4-M-N in the the N-th user.

Each of the illustrated delay unit (D) 3-m-n delays the cancellation error signal sent to the ICU 2-m-n until an output signal appears from the ICU 2-m-n to supply a delayed cancellation error signal to the adder 4-m-n. The adder 4-m-n subtracts the output signal of the ICU 2-m-n from the output signal of the delay unit (D) 3-m-n, and sends a renewed cancellation error signal to the next (n+1)-th user. In the case of the N-th user, the output signal is sent to the highest or the first user of the next (m+1)-th stage. On the other hand, the delay device (D) 3-M-N and the adder 4-M-N are unnecessary in connection with the N-th user of the M-th stage since no output signal may be sent from the M-th stage.

Figure 3:
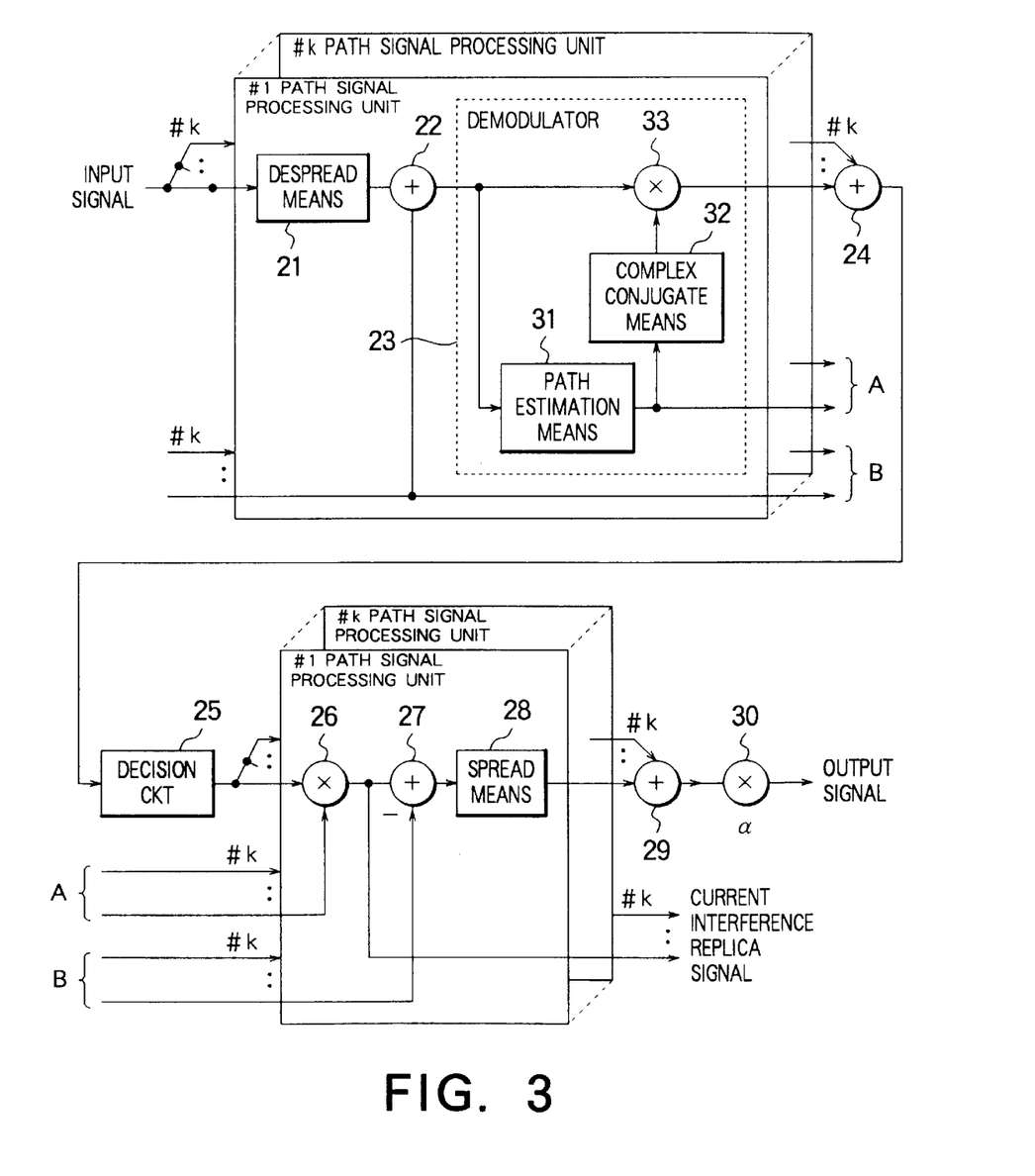
FIG. 3 is a block diagram of an interference cancellation unit used in FIG. 2.

Referring to FIG. 3 together with FIG. 2, the ICU 2-m-n will be described in detail.

As shown in FIG. 3, the ICU 2-m-n is divided into a forward block (i.e., the prior #k path signal processing unit) and a backward block (i.e., the posterior #k path signal processing unit. The forward block has, as a multipath unit, first through K-th path signal processing units each of which includes despread means 21, an adder 22, and a demodulator 23, where K is an integer not smaller than unity. The forward block is connected to the backward block through a common adder 24 and a common discriminator 25 which are shared by the first through the K-th path signal processing units. The backward block includes, as a multipath element, first through K-th path elements each of which is formed by a multiplier 26, an adder 27, and spread means 28. An adder 29 which receives outputs of first through K-th spread means 28 sums up the outputs to send a sum signal as the output signal to the next user or the next stage.

As readily understood by comparison of FIGS. 1 and 3, the adders 22 and 27 are added to the forward and the backward blocks illustrated in FIG. 3 while the demodulator is formed by path estimation means 31, complex conjugate means 32, and a multiplier 33 like in FIG. 1.

As regards the k-th path (1≦k≦K), the despread means 21 uses the n-th user spread code $c_{n,k}$ and despreads the error signal into a despread signal at a timing combined with the k-th path and then produces the despread signal. The adder 22 adds the despread signal to the interference replica signal (desired signal) $h_{m-1,n,k} \cdot d_{m-1,n}$ which is estimated at the previous (m−1)-th stage placed before the m-th stage. At any rate, a sum signal is produced from the adder 22. Such an addition in the adder 22 is made at each of the first through the X-th paths.

As regards the first stage, no interference replica signal is added in the adder 22 of the first stage. This is because no previous (m−1)-th stage is located before the first stage.

The demodulator 23 is similar in structure to that illustrated in FIG. 1 and uses path estimation means 31 to carry out coherent demodulation of the sum signal sent from the adder 22 and to produce an output signal representative of a result of coherent demodulation. The output signal 19 sent through the complex conjugate means 32 to the multiplier 33 to weight an amplitude of the sum signal in accordance with the output signal sent from the path estimation means 31. Such a weight serves to conduct RAKE (maximum ratio) synthesizing like in FIG. 1. As a result, the multiplier 33 of each of the first through the K-th path segments produces a weighted detection signal.

The adder 24 performs the RAKE combining of the weighted demodulation signals sent from the multipliers 33 of the respective path signal processing units and sends a combined signal to the decision circuit 25. The discriminator 25 identifies the most likelihood transmission symbol $d_{m,n}$ from the combined signal sent from the adder 24 and sends out the result as an identification symbol to the multipliers 26 of the respective path signal processing units.

In each path signal processing unit, the multiplier 26 multiplies the identification symbol by the channel characteristics $h_{m,n,k}$ which is defined by the output signal of each path estimation means 31. Thus, such a multiplication is calculated at each of the first through the K-th paths. The first through the K-th output signals of the multiplier 26 for the first through the K-th paths are then sent to the next stage as the interference replica signals $h_{m,n,k} \cdot d_{m,n}$ of the current m-th stage.

The adder 27 then subtracts the previous (m−1)-th stage interference replica signal from each output signal of the multiplier 26 for each path.

The spread means 28 uses the n-th user spreading code $c_{n,k}$ and carries out spread processing of an output signal of the adder 27 at a timing combined with the k-th path to produce a spread signal.

The adder 29 sums up first through K-th ones of the spread signals sent from the spread means 28 for the first through the K-th paths and produces as an output signal a spread processing result concerned with a difference between the m-th stage interference replica signal for the n-th user and the previous (m−1)-th stage interference replica signal.

Figure 4:
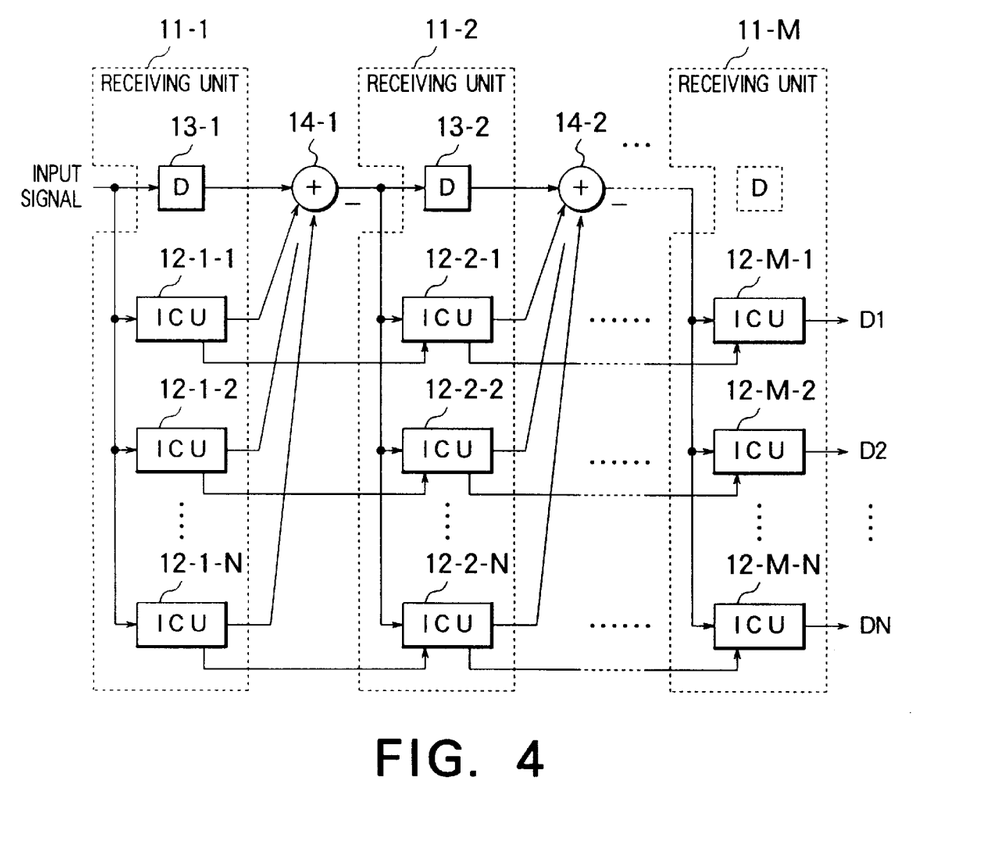
FIG. 4 is a block diagram of a multiuser receiver according to a second embodiment of this invention.

Referring to FIG. 4, a multiuser receiver according to a second embodiment of this invention includes is applicable to a CDMA system like the other embodiments and includes first through M-th stages-of receiving units 11-1, 11-2 and 11-M, where M is an integer not smaller than unity. An m-th stage of the receiving units 11-m (1≦m≦M) is divided into first through N-th users, where N is an integer not smaller than unity. The first through the N-th users are connected in parallel with one another in the first stage 11-1 through the M-th stage 11-M. This means that demodulation and interference cancellation operations are performed in parallel without referring to the reception levels mentioned in conjunction with FIG. 2.

More specifically, the first stage and the M-th stage of the receiving units are different in structure from the remaining stages of the receiving units. The first stage receiving unit 11-1 is not connected to a previous stage and is therefore supplied with an input or reception signal itself as a cancellation error signal. In other words, the input signal is supplied to the delay unit 13-1 and the ICU 12-1-1 to 12-1-N in parallel. On the other hand, the ICU 12-M-1 to 12-M-N in the M-th stage need not re-estimate any interference replica signals but produce demodulation results as first through N-th user demodulation signals D1, D2, and DN, respectively. In addition, the delay device (D) 13-M and the adder 14-M are eliminated in the M-th stage of the receiving unit 11-M.

As regards the remaining stages except the first and the M-th stages, the n-th receiving unit 11-m at the m-th stage has first through N-th interference cancellation units (ICU) 12-m-1 to 12-m-N and a delay unit 13-m, where N is an integer not smaller than unity. Herein, description is made about an n-th (1≦n≦N) ICU 12-m-n prepared for an n-th user. In addition, an adder 14-m is located between two adjacent stages of the receiving units 11-m and 11-(m+1).

The n-th ICU 12-m-n of the m-th stage of the receiving unit 11-m is supplied with the interference replica signals estimated by the 12-(m−1)-n which is located in the previous (m−1)-th stage. Moreover, the 12-m-n of the m-th stage of the receiving unit 11-m is also supplied with a cancellation error signal obtained from the adder 14-(m−1) which carries out the interference cancellation process for each user in the previous (m−1)th stage.

In the m-th stage of the receiving unit 11-m, the interference replica signals are re-estimated into re-estimated signals by the ICU 12-m-1 to 12-m-N and are sent to the corresponding ICU 12-(m+1)-1 to 12-(m+1)-N of the same users in the next (m+1)-th stage. In addition, the ICU 12-m-1 to 12-m-N produce spread process results which are concerned with differences between the interference replica signals of the m-th stage and the previous (m−1)-th stage.

The delay device (D) 13-m delays the cancellation error signal given to the ICU 12-m-1 to 12-m-N until output signals appear from the ICU 12-m-1 to 12-in-N and sends a delayed signal to an adder 14-(m+1). The adder 14-m subtracts a total sum of the spread process results of the ICU 12-m-1 to 12-in-N from the delayed signal of the delay device (D) 13-m and sends a new cancellation error signal to the next (m+1)-th stage. As described 1above, the delay unit (D) 13-M and the adder 14-M are not necessary in connection with the M-th stage since the output signals at the final M-th stage are the demodulation signals for the first through the N-th users.

In case where the number N of users which forms parallel users becomes large in each stage, the reliability of the cancellation error signal obtained from the interference cancellation operation may be reduced and the performance is also deteriorated. In such cases, a multiplier 30 may be connected to the adder 29 in the backward block, as shown in FIG. 3. Specifically, a weight a which is not greater than unity is multiplied by the output signal of the adder 29 in the multiplier 30. This structure is effective to avoid a reduction of reliability and deterioration in interference cancellation performance.

Further, the multiplier 30 may not always be connected after the adder 29. For instance, the same effect can be accomplished by connecting the multiplier 30 between the spread means 28 and the subtracter 27.

Figure 5:
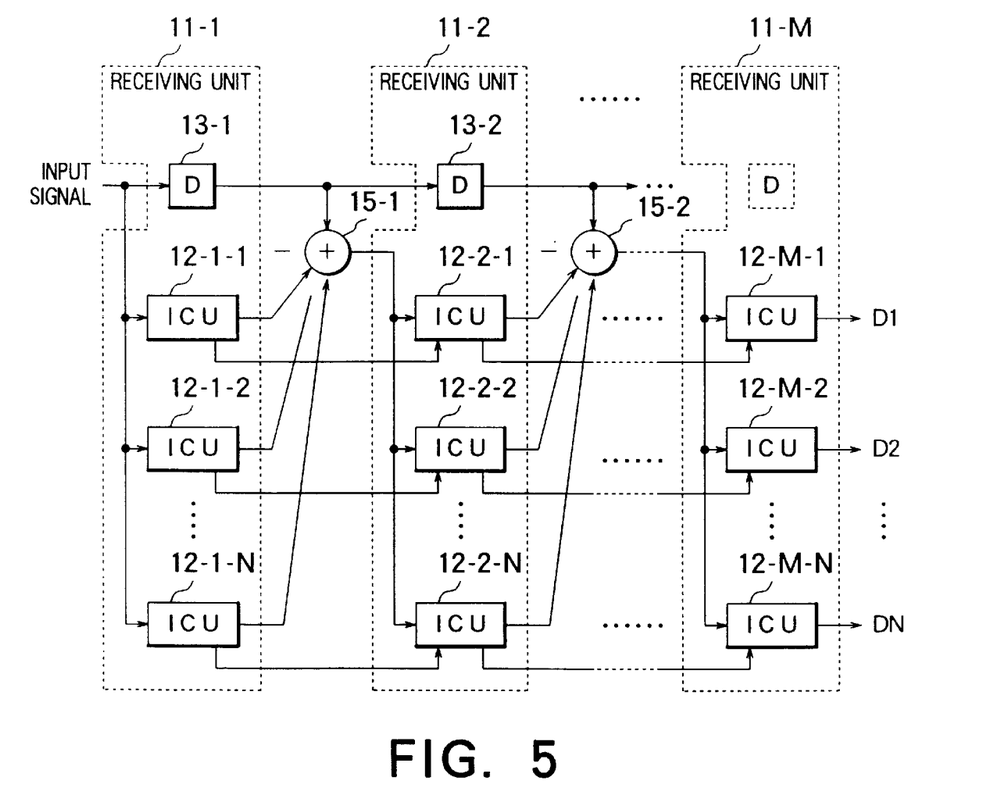
FIG. 5 is a block diagram of a multiuser receiver according to a third embodiment of this invention.

Referring to FIG. 5, a multiuser receiver according to a third embodiment of this invention is similar in structure to that illustrated in FIG. 4 except that the delayed signal of each delay unit 13-m is delivered not only to the adder 15-m but also to the delay unit 13-(m+1) in the next (m+1)-th stage. Specifically, the receiver illustrated in FIG. 5 forms a multiuser receiver for the CDMA system and includes first through M-th receiving units 11-1 to 11-M where M≦1. This shows that the first through the M-th receiving units 11-1 to 11-M form first through M-th stages like in the previous embodiments. In each stage of the receiving unit 11-m (1≦m≦M), first through N-th users (N≧1) are formed at each stage in correspondence to first through N-th users. Like in FIG. 4, demodulation and interference cancellation operations are performed regardless of the reception levels.

In addition, the receiving unit 11-m at the m-th stage is provided with the ICU 12-m-n corresponding to the n-th (1≦n≦N) user and with the delay unit (D) 13-m. An adder 15-m is connected to the delay unit (D) 13-m and to the ICU 12-m-1 to 12-m-N and is supplied with a delayed signal of the delay device (D) 13-m and output signals obtained by interference cancellation operations carried out by the ICU 12-m-1 to 12-m-N.

As shown in FIG. 5, each of the n-th ICU 12-m-n of the m-th stage is given the error signal obtained by the adder 15-(m−1) as a result of the interference cancellation operation in the previous (m−1)-th stage together with the interference replica signals estimated in the ICU 12-(m−1)-n for same user in the previous (m−1)-th stage.

With this structure, the subtracter 27 (shown in FIG. 3) is unnecessary in the ICU 12-m-n. Further, there is also no need to re-estimate the M-th stage interference replica signals in the ICU 12-M-1 to 12-M-N of the M-th stage. Thus, the ICU 12-M-1 to 12-M-N produce results of demodulation as user demodulation signals D1 to DN.

Like in FIG. 4, the ICU 12-1-1 to 12-1-N of the first stage are supplied with the input signal itself as the cancellation error signal. The delay unit (D) 13-M and the adder 15-M are eliminated in the M-th stage also, as mentioned in connection with FIG. 4.

The delay unit (D) 13-m delays the delayed signal of the delay unit (D) 13-(m−1) until output signals appear from ICU 12-m-n and sends the delayed signal to both the adder 15-m and the delay unit (D) 13-(m+1) in the next (m+1)-th stage.

At the first stage, the input signal is given to both the delay unit 13-1 and the ICU 12-1-1 to 12-1-N. From this fact, it is readily understood that each of the delay units (D) 13-m at each stage is operable to successively delay the input signal.

The adder 15-m subtracts a total sum of spread process results obtained by the ICU 12-m-1 to 12-m-N from the delayed signal of the delay unit (D) 13-m and sends a new error signal to the ICU 12-(m+1)-1, ICU 12-(m+1)-2 and ICU 12-(m+1)-N at the next (m+1)-th stage. As described above, the delay unit (D) 13-M and the adder 15-M are not necessary like in FIG. 4.

Stated otherwise, the above parallel structure shown in FIG. 4 and FIG. 5 makes it possible to shorten the demodulation delay.

In the above description, the interference replica signals reproduced by the ICUs are formed by the number obtained by multiplying the identification symbol by the number of transmission channel characteristics for each path and transmitted to a next following stage at a symbol rate to be subjected to addition or subtraction and to be further subjected to summation for each path.

While this invention has thus far been described in conjunction with a few embodiments thereof, it will be readily possible for those skilled In the art to put this invention into practice in various other manners. For example, this invention is applicable not only to short code spread modulation wherein a spread code period is equal to the symbol period but also to long code spread modulation wherein a spread code period is longer than the symbol period.

What is claimed is:

1. A multiuser receiver for use in a Code Division Multiple Access (CDMA) system to produce first through N-th demodulated signals for N-th users in response to an input signal where N is an integer not smaller than unity, said receiver having first through M-th stages, where M is an integer not smaller than unity, said multiuser receiver comprising:

first through N-th interference cancellation units, which are included at each stage within the first through the M-th stages and which are supplied with cancellation error signals obtained from a previous interference cancellation, for producing first through N-th interference replica signals of a present stage and first through N-th spread signals representing differences between the interference replica signals of the present stage and interference replica signals of a previous stage, wherein said interference replica signals are comprised of a combination of identification symbols and transmission channel characteristics, and further wherein said identification symbols are transmission symbols chosen by a decision circuit from a combined signal of all demodulated signals which have been received, and said transmission channel characteristics are characteristics of signal paths of the demodulated signals.

2. A multiuser receiver as claimed in claim 1, wherein the first through the N-th interference cancellation units of each stage is coupled in serial to one another to supply first through the (n−1)-th cancellation error signals to the second through n-th interference cancellation units for an n-th user, where n is a number between 2 and N, inclusive, and an N-th cancellation error signal to the first interference cancellation unit for the first user in the next stage.

3. A multiuser receiver as claimed in claim 2, wherein the first through the N-th users are ranked on the basis of reception levels and have a highest one to a lowest one of the reception levels, respectively.

4. A multiuser receiver as claimed in claim 3, further comprising:

first through N-th delay units for delaying the first through the (N−1)-th cancellation error signals to produce first through (N−1)-th delays cancellation error signals; and first through N-th adders, coupled to the first through the N-th interference cancellation units and the first through the N-th delay units, for subtracting the first through the N-th spread signals from the first through the (N−1)-th delayed cancellation error signals to produce the first through the N-th cancellation error signals, respectively.

5. A multiuser receiver as claimed in claim 4, wherein the input signal is supplied as the first cancellation error signal to both the first interference cancellation unit and the first delay unit at the first stage.

6. A multiuser receiver for use in a Code Division Multiple Access (CDMA) system to produce first through N-th demodulated signals for N-th demodulated signals for N-th users in response to an input signal where N is an integer not smaller than unit, said receiver having first through M-th stages, where M is an integer not smaller than unity, said multiuser receiver comprising:

first through M-th interference cancellation units (ICU), which are included at each stage within the first through the M-th stages and which are supplied with a cancellation error signal obtained at a previous stage, for producing first through N-th interference replica signals of a present stage and first through N-th spread signals concerned with differences between the interference replica signals of the present stage and interference replica signals of a previous stage, wherein each of said interference replica signals is comprised of a combination of an identification symbol determined by a decision circuit from combined demodulated signals which have been received, and transmission channel characteristics output by a path estimation circuit;

a delay unit, which is included at each stage, for delaying said cancellation error signal to produce a delayed cancellation error signal; and subtracting means for subtracting a total of the first through the N-th spread signals sent from the present stage from the delayed cancellation signal to supply a result of subtraction as a new cancellation error signal to the next stage.

7. A multiuser receiver as claimed in claim 6, wherein the input signal is given as the cancellation error signal at the first stage.

8. A multiuser receiver for use in a Code Division Multiple Access (CDMA) system to produce first through N-th demodulated signals for N-th users in response to an input signal where N is an integer not smaller than unity, said receiver having first through M-th stages, where M is an integer not smaller than unity, said multiuser receiver comprising:

first through N-th interference cancellation units (ICU), which was included at each stage within the first through the M-th stages and which are supplied with a cancellation error signal obtained at a previous stage, for producing first through N-th interference replica signals concerned with the interference replica signals of the present stage, said ICUs further comprising decision circuits which receive combined demodulated signals and output identification symbols;

path estimation circuits which output transmission channel characteristics;

multipliers which multiply said identification symbols and said transmission channel characteristics to obtain said interference replica signals;

a delay unit, which is included in each stage, for delaying said input signal to produce a delayed input signal; and subtracting means for subtracting a total of the first through the N-th spread signals sent from the present stage from the delayed input signal sent from the delay unit at the present stage to supply a result of subtracting as a new cancellation error signal to the next stage.

9. An interference cancellation unit for use in a Code Division Multiple Access (CDMA) system to produce a spread signal and an interference replica signals in response to an input cancellation error signal and interference replica signals estimated in previous stage, said interference cancellation unit comprising:

a first set of path signal processing units which are arranged in correspondence to a plurality of multipaths signals, respectively, and which are supplied with the previous interference replica signals for the respective paths together with the input signal;

each of the path signal processing units of the first-set comprising despread means for despreading the input signal into a despread signal;

a first adder for adding each of the previous interference replica signal for a path to the despread signal to produce an output signal; and a demodulator for demodulating the output signal sent from the first adder to produce a demodulated signal for each path and to output transmission channel characteristics estimated therein;

the interference cancellation unit further comprising a second adder which is connected in common to the path signal processing units of the first set and which is supplied with the demodulated signals from the respective units for adding all of the demodulated signals to produce a combined signal;

a decision circuit for identifying a transmission symbol from the combined signal sent from the second adder; and a second set of path signal processing units which are arranged in correspondence to the respective paths and which are supplied with the transmission symbol identified by the decision circuit, the transmission channel characteristics estimated by the respective path signal processing units of the first-set, and the previous interference replica signals;

each of the path signal processing units of the second-set comprising a multiplier for multiplying the transmission channel characteristics sent from said demodulator of each path signal processing units of the first-set by the transmission symbol estimated by said decision circuit to produce a present interference replica signal;

a subtracter for substracting each of the previous interference replica signal from the present interference replica signal to produce a difference signal representative of a difference between each of the previous interference replica signal and the present interference replica signal; and spreading means for performing spreading processing of the difference signal to produce a spread signal of each path signal processing unit of the second-set;

the interference cancellation unit further comprising a third adder which is connected in common to the path signal processing units of the second-set and which are supplied with the spread signals sent from the respective path signal processing units of the second-set to combine the spread signals together and to produce a combined spread signal as the spread signal.

10. An interference cancellation unit as claimed in claim 9, further comprising:

weighting means for weighting the combined spread signal with a predetermined factor smaller than unity.

11. An interference cancellation unit as claimed in claim 9, wherein each of the path signal processing units of the second set further comprises:

weighting means located after the subtracter for weighting the difference signal with a predetermined factor smaller than unity.

12. An interference cancellation unit (ICU) comprised in a multiuser receiver for use in a Code Division Multiple Access (CDMA) system to produce first through N-th demodulated signals for N-th users in response to an input signal where N is an integer not smaller than unity, said receiver having first through M-th stages where M is an integer not smaller than unity, and said interference cancellation unit producing a spread signal and an interference replica signals in response to an input cancellation error signal and interference replica signals estimated in a previous stage, said interference cancellation unit comprising:

a first set of path signal processing units which are arranged in correspondence to a plurality of multipath signals, respectively, and which are supplied with the previous interference replica signals for the respective paths together with the input cancellation error signal, to output a weighted demodulation signal; and each of the path signal processing units of the first-set comprising;

despreading means for despreading the input cancellation error signal into a despread cancellation error signal;

an adder for adding the interference replica signal to the despread cancellation error signal to produce an added signal; and means for producing said weighted demodulation signal in response to said added signal.

13. An interference cancellation unit (ICU) for use in a Code Division Multiple Access (CDMA) system to produce a spread signal and an interference replica signals in response to an input cancellation error signal and previous interference replica signals estimated in a previous stage, said interference cancellation unit comprising:

a set of path signal processing units which are arranged in correspondence to a plurality of multipaths signal, respectively, which are supplied with the previous interference replica signals for the respective paths together with the input local cancellation error signal, and which output spread signals and current interference replica signals; and a third adder which is connected in common to the path signal processing units of the second-set and which are weighting means supplied with the local spread signals for combining the local spread signals together to produce a combined spread signal as the spread signal.

* * * * *

UNITED STATES PATENT AND TRADEMARK OFFICE
CERTIFICATE OF CORRECTION

PATENT NO.: 6,081,516
DATED: June 27, 2000
INVENTOR(S): YOSHIDA, Shousei, USHIROKAWA, Akihisa It is certified that error(s) appears in the above-identified patent and that said Letters Patent is hereby corrected as shown below:

In the Abstract line 15, delete "Into" insert --into--.

Column 4, line 67, delete "rm-$_{7,n}$" insert --x$_{m-7,n}$--.

Column 7, line 60, delete "x-th" insert --K-th--.

Column 9, line 28, delete "12-in-N" insert --12-n-N--.

line 31, delete "12-in-N" insert 12-n-N--.

line 33, delete "1 above" insert --above--.

Column 11, line 48, delete "unit" insert --unity--.

Signed and Sealed this

Seventeenth Day of April, 2001

*Attest:*

NICHOLAS P. GODICI

*Attesting Officer*      *Acting Director of the United States Patent and Trademark Office*